United States Patent
Bales et al.

(10) Patent No.: US 10,633,731 B2
(45) Date of Patent: Apr. 28, 2020

(54) METHOD FOR PRODUCING ENHANCED FATIGUE AND TENSILE PROPERTIES IN INTEGRALLY BLADED ROTOR FORGINGS

(71) Applicant: United Technologies Corporation, Farmington, CT (US)

(72) Inventors: Daniel A. Bales, Avon, CT (US); Andrew L. Haynes, Glastonbury, CT (US); Luke H. Rettberg, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 114 days.

(21) Appl. No.: 15/863,163

(22) Filed: Jan. 5, 2018

(65) Prior Publication Data

US 2019/0211433 A1    Jul. 11, 2019

(51) Int. Cl.
*F04D 29/34* (2006.01)
*C22F 1/18* (2006.01)
(Continued)

(52) U.S. Cl.
CPC .......... *C22F 1/183* (2013.01); *B23K 20/1205* (2013.01); *B23K 20/129* (2013.01); *B23K 20/233* (2013.01); *B23K 20/24* (2013.01); *B23K 20/26* (2013.01); *C22F 1/002* (2013.01); *F01D 5/3061* (2013.01); *F01D 5/34* (2013.01); *F04D 29/329* (2013.01); *F04D 29/34* (2013.01); *F04D 29/388* (2013.01); *B23K 2101/001* (2018.08); *B23K 2103/14* (2018.08); *B23K 2103/18* (2018.08); *B23K 2103/26* (2018.08);
(Continued)

(58) Field of Classification Search
None
See application file for complete search history.

(56) References Cited

U.S. PATENT DOCUMENTS 4,873,751 A    10/1989    Walker et al.
6,438,838 B1    8/2002    Meier et al.
(Continued)

FOREIGN PATENT DOCUMENTS

EP    2620516 A2    7/2013
EP    3143171 A2    3/2017
RU    2551045 C1    5/2015

OTHER PUBLICATIONS

European Search Report dated Apr. 8, 2019 issued for European Patent Application No. 19150607.0.
(Continued)

*Primary Examiner* — Michael Lebentritt
(74) *Attorney, Agent, or Firm* — Bachman & LaPointe, P.C.

(57) ABSTRACT

A method for producing an enhanced property integrally bladed rotor includes solution heat treating a stub-containing rotor hub forging; water quenching the solution heat treated stub-containing rotor hub; aging the water quenched stub-containing rotor hub forging; linear friction welding airfoils onto each of a multiple of stubs of the stub-containing rotor hub forging; and concurrently stress relieving the linear friction welds of each of the multiple of stubs within a predefined area while ensuring that a hub inner diameter does not exceed a predetermined temperature.

16 Claims, 5 Drawing Sheets

(51) Int. Cl.
*B23K 20/12* (2006.01)
*C22F 1/00* (2006.01)
*B23K 20/26* (2006.01)
*B23K 20/233* (2006.01)
*F01D 5/34* (2006.01)
*F01D 5/30* (2006.01)
*B23K 20/24* (2006.01)
*F04D 29/32* (2006.01)
*F04D 29/38* (2006.01)
*B23K 101/00* (2006.01)
*B23K 103/14* (2006.01)
*B23P 15/00* (2006.01)
*B23K 103/18* (2006.01)
*F02K 3/06* (2006.01)
*F04D 29/02* (2006.01)

(52) U.S. Cl.
CPC .............. *B23P 15/006* (2013.01); *F02K 3/06* (2013.01); *F04D 29/023* (2013.01); *F05D 2220/32* (2013.01); *F05D 2230/239* (2013.01); *F05D 2230/25* (2013.01); *F05D 2230/40* (2013.01)

(56) References Cited

U.S. PATENT DOCUMENTS

| | | | | |
|---|---|---|---|---|
| 6,524,409 | B2 * | 2/2003 | Barone | C22F 1/00 148/437 |
| 6,536,110 | B2 * | 3/2003 | Smith | B23P 6/005 148/669 |
| 6,551,372 | B1 * | 4/2003 | Ewing | C22C 1/0433 419/28 |
| 7,358,466 | B1 | 4/2008 | Myers et al. | |
| 7,449,075 | B2 * | 11/2008 | Woodfield | C22C 14/00 148/421 |
| 8,375,582 | B2 | 2/2013 | Bayer et al. | |
| 8,437,628 | B1 * | 5/2013 | Lin | C21D 9/50 29/889.7 |
| 2003/0000602 | A1 | 1/2003 | Smith et al. | |
| 2006/0078455 | A1 * | 4/2006 | Troitski | B22F 7/08 419/5 |
| 2009/0185908 | A1 * | 7/2009 | Chung | B23K 20/1205 416/213 R |
| 2011/0076147 | A1 * | 3/2011 | Ganesh | B21J 5/002 416/204 R |
| 2012/0279066 | A1 * | 11/2012 | Chin | B23P 6/007 29/889.1 |
| 2014/0093384 | A1 * | 4/2014 | Mironets | B22F 5/009 416/241 R |
| 2014/0117007 | A1 | 5/2014 | Trapp et al. | |
| 2014/0140859 | A1 * | 5/2014 | Bales | F01D 5/28 416/96 R |
| 2016/0153286 | A1 * | 6/2016 | Suciu | F01D 5/28 60/805 |
| 2016/0160869 | A1 * | 6/2016 | Roach | F04D 29/023 415/200 |
| 2017/0022827 | A1 * | 1/2017 | Waldman | F01D 5/3061 |
| 2017/0268091 | A1 * | 9/2017 | Woodfield | C22F 1/183 |
| 2018/0371594 | A1 * | 12/2018 | Raghavan | B23K 26/352 |

OTHER PUBLICATIONS

European Search Report dated May 22, 2019 issued for European Patent Application No. 19150589.0.

* cited by examiner

METHOD FOR PRODUCING ENHANCED FATIGUE AND TENSILE PROPERTIES IN INTEGRALLY BLADED ROTOR FORGINGS

BACKGROUND

The present disclosure generally relates to titanium forgings, and more particularly, to a method and apparatus to increase the fatigue and tensile properties of fabricated integrally bladed rotors.

Cost effective manufacturing of a fabricated integrally bladed rotor (IBR) typically involves joining a plurality of airfoils to a titanium forged hub. A conventional manufacturing process for an IBR includes machining a forging (typically Ti-6-4 titanium alloy) to a pre-heat treat shape, solution heat treating, then liquid quenching to obtain a rapid cooling rate from the solution heat treat temperature, then subsequently annealing. Following annealing, the forging is machined to a rectilinear sonic inspection shape, then sonic inspected prior to additional machining. Another conventional process incorporates a machining step of the pre-heat treat shape to produce airfoil stubs such that increased cooling rates may be achieved further inboard toward a final inner diameter flow path.

SUMMARY

A method for producing a rotor hub, according to one disclosed non-limiting embodiment of the present disclosure includes solution heat treating a stub-containing rotor hub forging; water quenching the solution heat treated stub-containing rotor hub forging; aging the water quenched stub-containing rotor hub forging; linear friction welding airfoils onto each of a multiple of stubs of the stub-containing rotor hub forging; and concurrently stress relieving the linear friction welds of each of the multiple of stubs at least within a predefined area while ensuring that a hub inner diameter does not exceed a predetermined temperature.

A further aspect of the present disclosure includes that the predetermined temperature is 1000 degrees F.

A further aspect of the present disclosure includes that concurrently stress relieving the linear friction welds of each of the multiple of stubs comprises maintaining the predefined area at 1100 degrees F. for a predetermined time period.

A further aspect of the present disclosure includes that the predetermined time period is 6 hours.

A further aspect of the present disclosure includes warm-working the multiple of stubs prior to the solution heat treating.

A further aspect of the present disclosure includes warm-working the multiple of stubs subsequent to the solution heat treating and prior to aging the water quenched stub-containing rotor hub forging.

A further aspect of the present disclosure includes machining the stub-containing rotor hub forging to a sonic shape prior to the solution heat treating.

A further aspect of the present disclosure includes stress relieving the linear friction welds of each of the multiple of stubs.

A further aspect of the present disclosure includes stress relieving the linear friction welds of each of the multiple of stubs only within a predefined area.

An integrally bladed rotor, according to one disclosed non-limiting embodiment of the present disclosure includes a stub-containing rotor hub forging; and an airfoil linear friction welded on each of a multiple of stubs of the stub-containing rotor hub forging, each of the airfoils and each of the multiple of stubs stress relieved within a predefined area.

A further aspect of the present disclosure includes that the predefined area is defined span wise along each of the airfoils and each of the multiple of stubs.

A further aspect of the present disclosure includes that the predefined area is greater than 1 inch from an inner diameter of a hub of the stub-containing rotor hub forging.

A further aspect of the present disclosure includes that the predefined area is greater than 0.375 inches and less than 3 inches from an inner diameter of a hub of the stub-containing rotor hub forging.

A further aspect of the present disclosure includes that the predefined area is greater than 0.5 inches and less than 2 inches from an inner diameter of a hub of the stub-containing rotor hub forging.

A further aspect of the present disclosure includes that the predefined area is displaced from an inner diameter of a hub of the stub-containing rotor hub forging.

A further aspect of the present disclosure includes that the stub-containing rotor hub forging is a titanium forging.

A further aspect of the present disclosure includes that each of the airfoils are hollow.

A further aspect of the present disclosure includes that each of the airfoils are solid.

The foregoing features and elements may be combined in various combinations without exclusivity, unless expressly indicated otherwise. These features and elements as well as the operation of the invention will become more apparent in light of the following description and the accompanying drawings. It should be appreciated, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
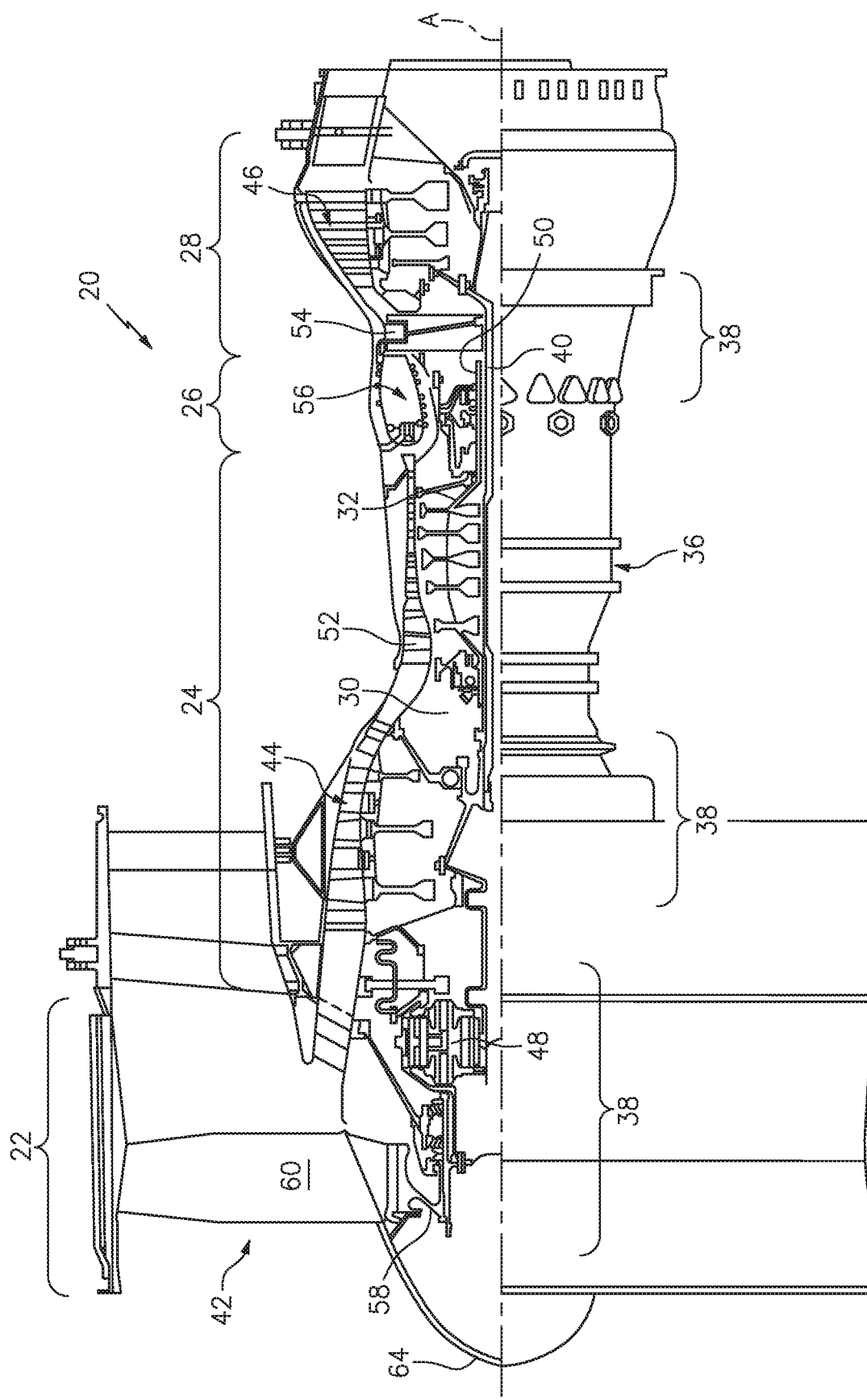
FIG. 1 is a partial cross-sectional illustration of a gas turbine engine.

FIG. 1 schematically illustrates a gas turbine engine 20. The gas turbine engine 20 as disclosed herein is a two-spool turbofan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

The fan 42 includes a rotor hub 58 with a plurality of circumferentially spaced fan blades 60. A nose cone 64 may be fastened to an upstream end of the rotor hub 58. The rotor may be provided in the form of an integrally bladed rotor (IBR; also, known as a blisk) which may be manufactured of a high-strength, low weight material such as a titanium alloy (typically Ti-6-4 alloy), high strength nickel base alloy, or other material. Although an example fan is illustrated and described in the disclosed embodiments, other components may also benefit herefrom.

Figure 2:
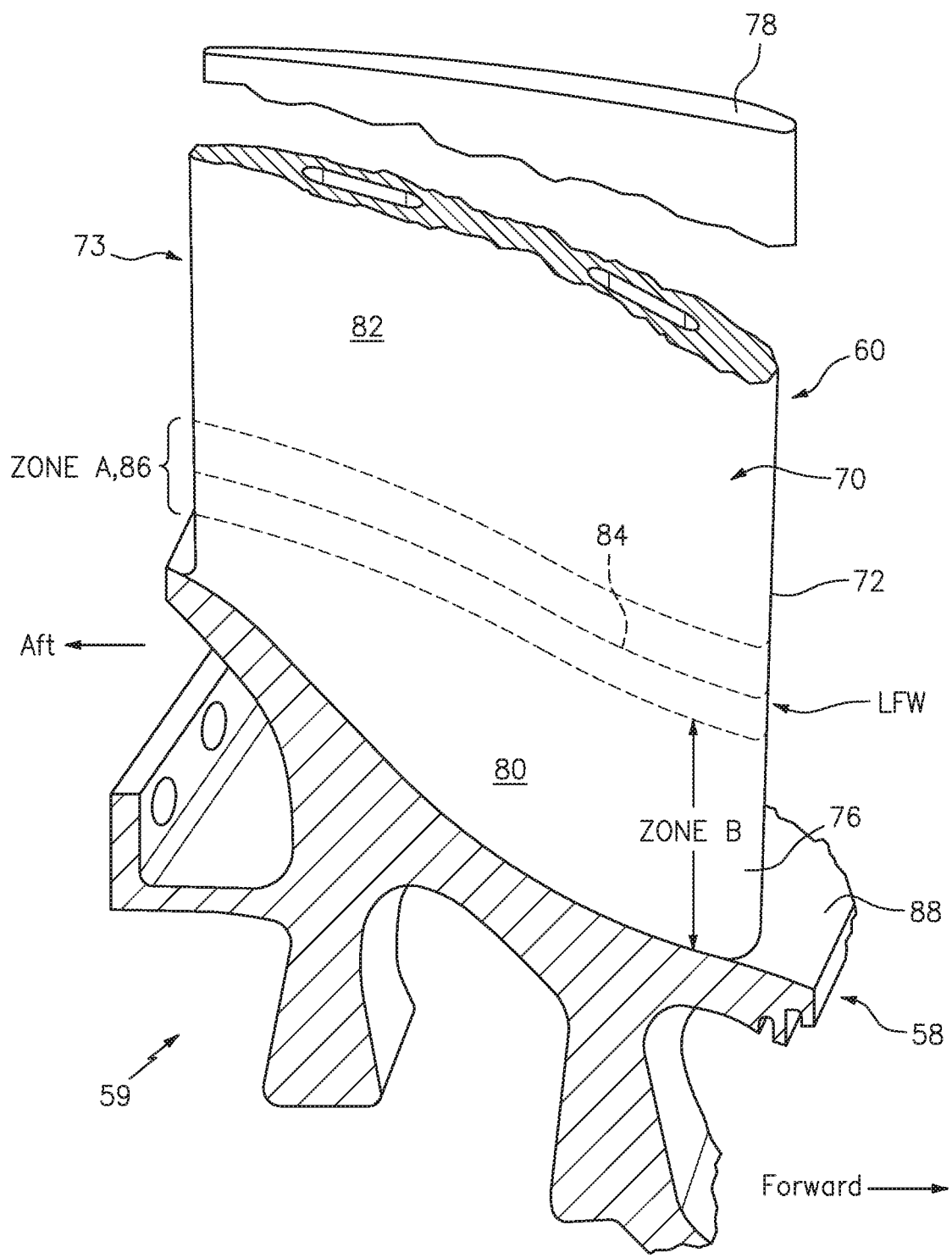
FIG. 2 is a partial cross-sectional illustration of a rotor hub of the gas turbine engine.

With reference to FIG. 2, the plurality of fan blades 60 are integrally formed with, and substantially radially extending from, the rotor hub 58. Each of the fan blades 60 defines an airfoil 70 which has a leading edge 72 and trailing edge 73 that extends from a blade root 76 to a blade tip 78. The fan blades 60 are integrated with the rotor hub 58 such that the fan blades 60 are integrally formed as a monolithic component with the rotor hub 58 to form an integrally bladed rotor 59. Each airfoil 70 is formed from an airfoil stub 80 that is machined into the rotor hub 58 and an airfoil section 82 that is linear friction welded (LFW) to the airfoil stub 80 at a linear friction weld 84 in a predetermined area 86.

Figure 3:
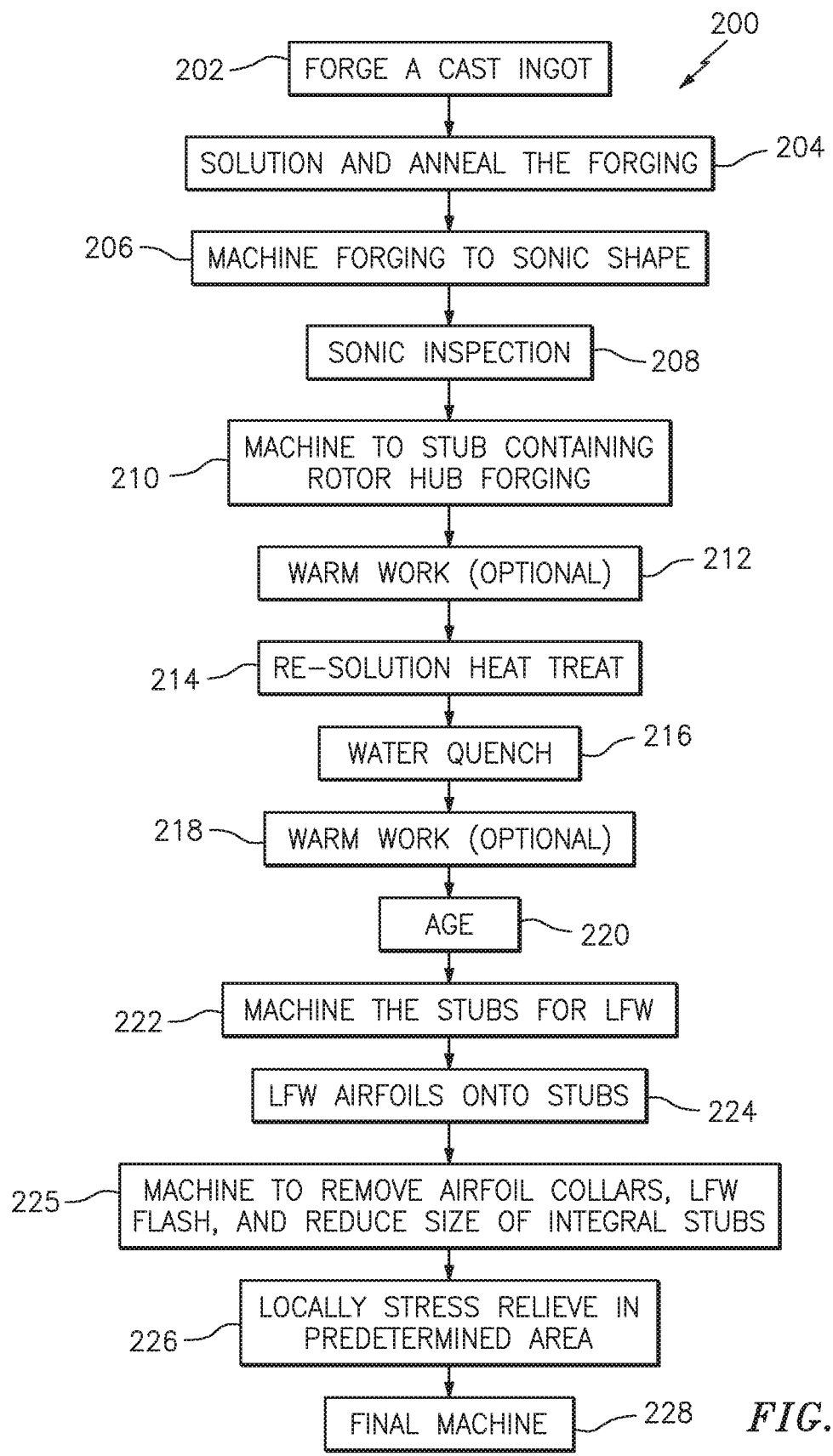
FIG. 3 illustrates a flow diagram of an example method to form a rotor hub.

With reference to FIG. 3, one non-limiting embodiment of a method 200 for producing the integrally bladed rotor 59 is disclosed. Initially, a cast ingot is forged (202). The forged ingot is then solution heat treated and annealed (204). The solution heat temperature varies from heat-to-heat of material due to chemistry variation. Each heat of Ti-6-4 material has a beta transus established by the mill. A solution heat treatment temperature is defined for each part based on the beta transus temperature, which is the lowest temperature at which a 100-percent beta phase can exist. For example, the forged ingot may be heated in argon, vacuum, or air, to a temperature within the range of 50-65 degrees F. (10-18 degrees C.) below beta transus; then held at the selected temperature ±15 degrees F. (±9 degrees C.) for 1 hour; then cooled at a rate equivalent to rapid air cool or faster; then annealed at 1300 degrees F. (704 degrees C.) in argon, vacuum, or air; held at heat for 2 hours; then cooled at a rate equivalent to air cool; and descaled as necessary.

The forged ingot is then machined to a sonic shape (206). A sonic shape is a rectilinear machined shape that is created from the forged ingot. The rectilinear shape facilitates sonic inspection. The sonic shape is then sonic inspected (208).

Next, the sonic shape is machined (210) to fabricate a stub-containing rotor hub forging. The stub-containing rotor hub forging is a nearer-net shape for linear friction welding (LFW) to the stubs 80. Optionally, a warm-working step (212) of the machined stubs 80 is provided for potential mechanical property/grain structure improvement.

The stub-containing rotor hub forging is then re-solution heat treated (214) using the same beta transus temperature that the mill used for its solution heat treatment. In one example, the stub-containing rotor hub forging is re-solution heat treated to a temperature in an upper portion of an acceptable solution temperature range. Alternatively, the machining of the stub-containing rotor is performed prior to the forging's initial solution heat treatment, thus making a re-solution step unnecessary.

Next, the solution heat treated stub-containing rotor hub forging is then water quenched (216). Alternatively, a warm-working step (218) of the machined stubs is next provided for enhanced aging and enhanced mechanical properties within the stub-to-inner flow path region. The water quenched stub-containing rotor hub forging is then aged (220). In one example, the stub-containing rotor hub forging is aged within a furnace at 1000 F for 6 hours.

The aged hub is then further machined to prepare for linear friction welding of the airfoils to the stubs (222).

An airfoil is then linear friction welded onto each of the stubs (224). One example shows the temperature at the linear friction weld 84 to be 2300 degrees F. (1260 degrees C.) and the temperature 0.125 inches (3.175 mm) on either side of the linear friction weld 84 is below 1000 degrees F. (538 degrees C.). Upon completion of all linear friction welding, the IBR 59 is machined to remove the airfoil collars, remove the LFW flash, and reduce the size of the stubs to which the airfoils were linear friction welded (225).

Next, each of the multiple of linear friction welds 84 is concurrently locally stress relieved within the predetermined area 86 (FIG. 2) (226). In one example, the predetermined area 86 is stress relieved at 1100 degrees F. (593 degrees C.) for 6 hours. Localized stress relief within the predetermined area 86 stress relieves the linear friction weld 84, yet ensures that the stubs 80 near a hub inner diameter 88 (FIG. 2) and the airfoil outwardly span wise to some design-determined outer diameter will not exceed 1000 degrees F. (538 degrees C.). This protects the improved fatigue and tensile properties previously achieved in (220). In one example, the predetermined area 86 is located at a distance greater than 0.375 inches (9.5 mm), but less than 3 inches (75 mm) from the inner diameter 88. In a more specific example, the predetermined area 86 is greater than 1.5 inches (38 mm) from the inner diameter 88. The total width of the predetermined area 86 in this example is approximately 0.250 inches (8 mm), but varies depending upon the IBR size.

Figure 4:
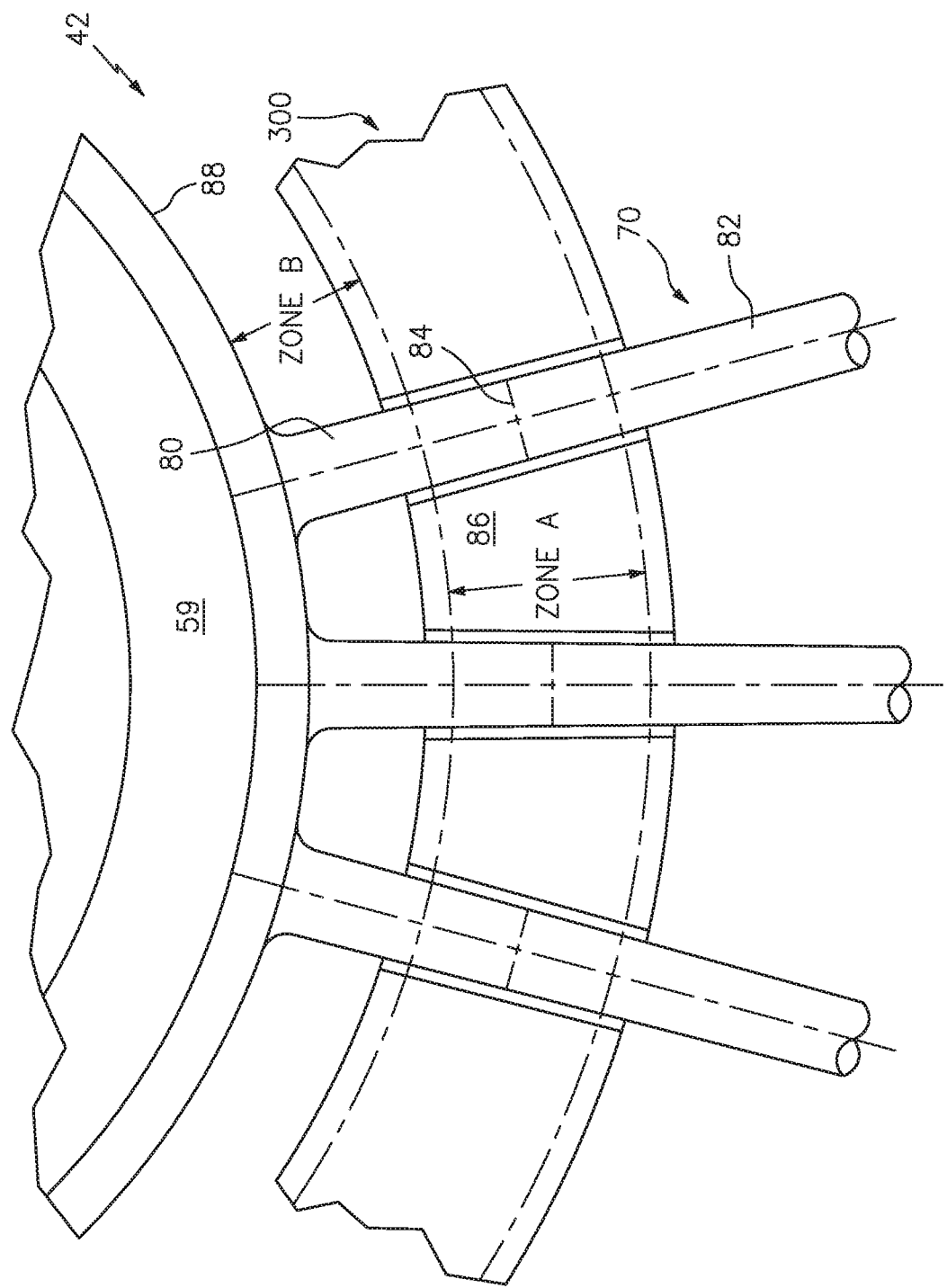
FIG. 4 illustrates a cross-sectional view of one-half of a circumferential tool for stress relieving the linear friction welds of each of the multiple of stubs within a predefined area on the stub-containing rotor hub forging and airfoil of an integrally bladed rotor.
Figure 5:
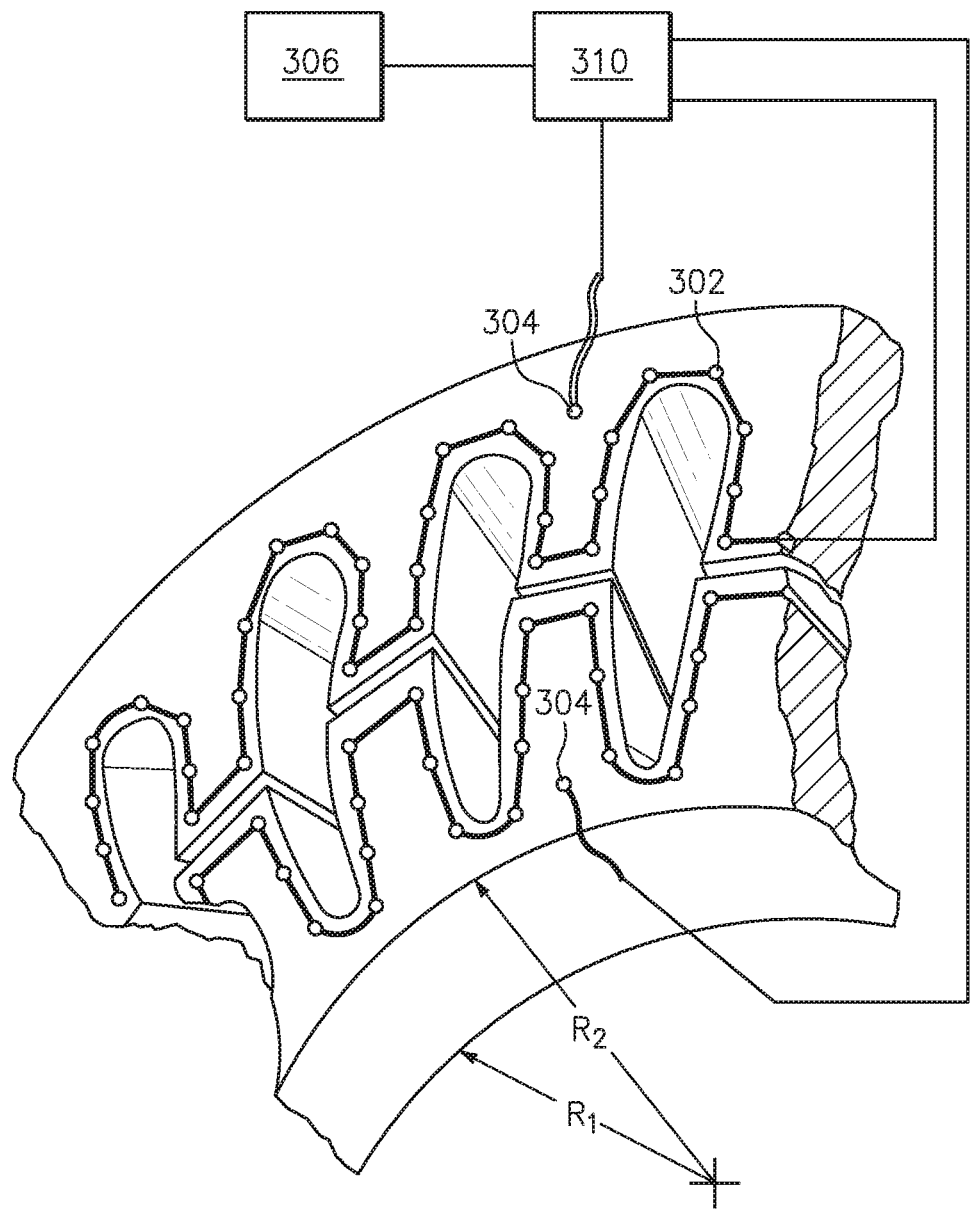
FIG. 5 illustrates a pictorial view of the 2-piece circumferential tool for stress relieving the linear friction welds of each of the multiple of stubs within a predefined area on the stub-containing rotor hub forging and airfoil of an integrally bladed rotor.

With reference to FIG. 4, the predetermined area 86 may be stress relieved with a heat treat fixture 300 that mounts around each airfoil 70 at the interface between the respective airfoil stub 80 and airfoil section 82 to span the predetermined area 86. The heat treat fixture 300 may be manufactured of a ceramic material to contain a multiple of heaters 302 (FIG. 5) that produce the desired radiant heat. The heaters 302 may be, for example, calorimetric heating rods or Calrod® tubular heaters manufactured by Wattco Inc. of Lachine, QC Canada. A multiple of thermocouples 304 may also be located in the heat treat fixture 300 to closely control the temperature of the multiple of heaters 302 in the predetermined areas 86 for each airfoil 70 in response to a control system 310 (FIG. 5).

In another embodiment, the airfoil section 82 that is linear friction welded (LFW) to the airfoil stub 80 may be of an equivalent or different material. For example, a hybrid nickel alloy IBR may be a semi-heat treated (or fully heat treated) nickel alloy hub of one material, with airfoils of a different nickel alloy linear friction welded onto the airfoil stubs 80, then subsequently locally stabilization and/or precipitation heat treated within the predetermined area 86, while maintaining a specified maximum temperature near the hub inner diameter 88 and outwardly span wise to the airfoils' tips 78.

The control system 310 may include at least one processor (e.g., a controller, microprocessor, microcontroller, digital signal processor, etc.), a memory, and an input/output (I/O) subsystem. The control system 310 may be embodied as any type of computing device. The processor and the I/O subsystem are communicatively coupled to the memory. The memory may be embodied as any type of computer memory device (e.g., volatile memory such as various forms of random access memory). The I/O subsystem may be communicatively coupled to a number of hardware, firmware, and/or software components, including a data storage device, a display, a communication subsystem, a user interface (UI) subsystem, the multiple of heaters 302, the multiple of thermocouples 304, and a power source 306.

The integrally bladed rotor 59 is then finish machined to a final configuration (228).

The method 200 for producing the integrally bladed rotor 59 potentially increases high cycle fatigue (HCF) strength by as much as 30% at 250 degrees F. (482 degrees C.), plus increases 0.2% yield and tensile strengths by as much as 15% at 250 degrees F. (482 degrees C.) compared to conventional processes. The increased HCF and tensile strengths can be leveraged to increase life for an existing weight. Alternatively, if life is held constant, the improved mechanical properties enables reduced part weight.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward", "aft", "upper", "lower", "above", "below", and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiments, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A method for producing a rotor hub, the method comprising:
   solution heat treating a stub-containing rotor hub forging;
   water quenching the solution heat treated stub-containing rotor hub forging;
   aging the water quenched stub-containing rotor hub forging;
   linear friction welding airfoils onto each of a multiple of stubs of the stub-containing rotor hub forging;
   concurrently stress relieving the linear friction welds of each of the multiple of stubs at least within a predefined area while ensuring that a hub inner diameter does not exceed a predetermined temperature; and
   warm-working the multiple of stubs subsequent to the solution heat treating and prior to aging the water quenched stub-containing rotor hub forging.

2. The method as recited in claim 1, wherein the predetermined temperature is 1000 degrees F.

3. The method as recited in claim 2, wherein concurrently stress relieving the linear friction welds of each of the multiple of stubs comprises maintaining the predefined area at 1100 degrees F. for a predetermined time period.

4. The method as recited in claim 3, wherein the predetermined time period is 6 hours.

5. The method as recited in claim 1, further comprising warm-working the multiple of stubs prior to the solution heat treating.

6. The method as recited in claim 1, further comprising machining the stub-containing rotor hub forging to a sonic shape prior to the solution heat treating.

7. The method as recited in claim 1, wherein stress relieving the linear friction welds of each of the multiple of stubs.

8. The method as recited in claim 1, wherein stress relieving the linear friction welds of each of the multiple of stubs only within a predefined area.

9. An integrally bladed rotor, comprising:
   a stub-containing rotor hub forging; and
   an airfoil linear friction welded on each of a multiple of stubs of the stub-containing rotor hub forging, each of the airfoils and each of the multiple of stubs stress relieved within a predefined area, the predefined area is displaced from an inner diameter of a hub of the stub-containing rotor hub forging, the multiple of stubs warm-worked subsequent to a solution heat treating and prior to an aging of a water quenched stub-containing rotor hub forging.

10. The rotor hub as recited in claim 9, wherein the predefined area is defined span wise along each of the airfoils and each of the multiple of stubs.

11. The rotor hub as recited in claim 10, wherein the predefined area is greater than 1 inch from an inner diameter of a hub of the stub-containing rotor hub forging.

12. The rotor hub as recited in claim 9, wherein the predefined area is greater than 0.375 inches and less than 3 inches from an inner diameter of a hub of the stub-containing rotor hub forging.

13. The rotor hub as recited in claim 9, wherein the predefined area is greater than 0.5 inches and less than 2 inches from an inner diameter of a hub of the stub-containing rotor hub forging.

14. The rotor hub as recited in claim 8, wherein the stub-containing rotor hub forging is a titanium forging.

15. The rotor hub as recited in claim 8, wherein each of the airfoils are hollow.

16. The rotor hub as recited in claim 8, wherein each of the airfoils are solid.

* * * * *